US006690672B1

United States Patent
Klein (10) Patent No.: US 6,690,672 B1
(45) Date of Patent: Feb. 10, 2004

(54) METHOD AND APPARATUS FOR PLACING AN INTELLIGENT TELEPHONE CALL USING AN INTERNET BROWSER

(75) Inventor: Robert M. Klein, Denver, CO (US)

(73) Assignee: Avaya Inc., Lincroft, NJ (US)

( * ) Notice: Subject to any disclaimer, the term of this patent is extended or adjusted under 35 U.S.C. 154(b) by 0 days.

(21) Appl. No.: 09/286,692

(22) Filed: Apr. 5, 1999

(51) Int. Cl.[7] .............................................. H04L 12/46
(52) U.S. Cl. ...................................... 370/401; 370/354
(58) Field of Search ................................ 370/352, 356, 370/401, 354, 353; 379/88.22, 88.13

(56) References Cited

U.S. PATENT DOCUMENTS

| | | | | |
|---|---|---|---|---|
| 5,943,399 A | * | 8/1999 | Bannister et al. | 379/88.17 |
| 6,031,836 A | * | 2/2000 | Haserodt | 370/384 |
| 6,144,667 A | * | 11/2000 | Doshi et al. | 370/401 |
| 6,188,673 B1 | * | 2/2001 | Bauer et al. | 370/352 |
| 6,259,691 B1 | * | 7/2001 | Naudus | 370/352 |
| 6,298,120 B1 | * | 10/2001 | Civanlar | 379/88.17 |
| 6,337,858 B1 | * | 1/2002 | Petty et al. | 370/356 |

\* cited by examiner

*Primary Examiner*—Kenneth Vanderpuye
(74) *Attorney, Agent, or Firm*—Patton Boggs LLP (57) ABSTRACT

An automated method and apparatus are provided for placing an intelligent telephone call using an Internet browser. The Internet web browser caller is presented with a web page particular to the called party, and the called party has provided to a personal receptionist server system a set of possible reach me numbers where the called party may be found at a particular time. One or more telephonic calls are then placed to attempt to reach the called party. If the system is successful in finding the called party, the text entered name of the caller via the web page is read and the server will ask the called party if a telephonic call is desired with the caller. If a conference with the caller is desired, the web page will be updated to display "please answer your phone, I have your party on the line" and the call back number will be rung to set-up the conference between the caller and called party. Alternatively, a telephonic call to the caller will be placed using Internet Protocol audio streaming technology. If the called party is not found or if the call is rejected, the web page will display something like "your party was not reachable . . . " and other alternate call answer options will be displayed (e.g., message drop, call redirection, information presentation).

19 Claims, 5 Drawing Sheets

FIG. 1
OPERATING ENVIRONMENT

FIG. 2
PERSONAL RECEPTIONIST SERVER ARCHITECTURE

FIG. 5
APPLET SERVICES

METHOD AND APPARATUS FOR PLACING AN INTELLIGENT TELEPHONE CALL USING AN INTERNET BROWSER

FIELD OF THE INVENTION

This invention relates to computer and communications systems, and more particularly to using an Internet browser to place an intelligent telephone call.

BACKGROUND OF THE INVENTION

The Internet and the World Wide Web are rapidly expanding, with individuals using the World Wide Web for increasing numbers of activities, such as searching for contact phone numbers for individuals and businesses which has traditionally been done manually using white and yellow pages or operator services. Once located, the web user can sometimes leave a return phone number via the web page or email for the individual or business. However, current systems do not provide an automated, interactive and immediate real-time call connection capability for the web page user to the individual or business.

In the telephony domain, commercial products are available which use an intelligent interactive telephony interface to place a caller on hold while the system places an outcall to the called party to see if the called party wishes to speak in real-time with the caller. If the called party desires to complete the conversation, the calls to the two parties are bridged/conferenced together. Otherwise, the caller is told that the called party is unavailable and some other call answer functionality is offered (e.g., the ability to leave a message for the called party). However, such systems do not interface to the Internet or World Wide Web.

SUMMARY OF THE INVENTION

According to the present invention, an automated method and apparatus are provided for placing an intelligent telephone call using an Internet browser. This "personal receptionist" server system includes an interactive personal call handling agent server function which provides a call answer interface for callers who attempt to contact the called party via a web browser on the Internet. The Internet web browser caller is presented with a web page particular to the called party (and possibly specific to the caller and time of the call), which displays whatever the called party has decided to present to the caller. In an embodiment, the called party has provided to the personal receptionist server system a set of possible "reach me" numbers where the called party may be found at a particular point in time. The web page interface offers the caller the option to enter their name and a call back number and a selection button which reads "Find Me."

Upon entry of the required name and call back number information and the selection of the "Find Me" button, the web page instructs the caller to "please wait while I attempt to reach . . . " The Java applet technology (using RMI—Remote Method Invocation) implementation of this web page then goes to the personal receptionist server database to access the called party's currently active "reach me" numbers and places one or more outcalls to attempt to reach the called party. If the system is successful in finding the called party, the text entered name of the caller is presented to the called party using interactive voice response technology (i.e., text to speech), and the server will ask the called party whether to conference a voice call with the caller. If a conference with the caller is desired the web page will be updated to display "please answer your phone, I have your party on the line" and the call back number will be rung to set-up the conference between the caller and called party. Alternatively, a telephonic call to the caller will be placed using Internet Protocol ("IP") audio streaming technology (e.g., Lucent Technologies elemedia™, RealNetworks RealAudio™). If the called party is not found or if the call is rejected, the web page will display something like "your party was not reachable . . . " and other alternate call answer options will be displayed (e.g., message drop, call redirection, information presentation).

Embodiments of the present invention include computer-readable medium containing computer-executable instructions for performing a method of the present invention, and a computer system having a processor and memory and performing a method of the present invention. An embodiment of the method of the present invention provides for connecting in real-time an originating communications device of an originating caller to a destination communications device of a destination caller.

An embodiment of this method can be performed comprising the steps of: (a) receiving a call request entered via a web page, the call request including a destination identification of the destination caller or destination communications device; (b) calling the destination communications device based on the received destination identification; (c) calling the originating communications device; and (d) bridging the calls to the destination and originating communications devices.

In an embodiment, the method further comprises the step of receiving and authenticating an identification code of the destination caller before performing the step of bridging the calls. In an embodiment, the method step (b) further includes receiving a call completion request. In an embodiment, method further comprises the step of (e) receiving an originating identification of the originating caller or the originating communications device; and step (c) is performed based on the received originating identification.

In an embodiment, the method further comprises the step of (e) retrieving, from a personal receptionist server configuration database and based on the received destination identification of the destination caller, a destination telephone number of the destination communications device. In an embodiment, the received destination identification of the destination caller identifies a group of callers, and step (e) further includes selecting one of the identified group of identified callers based on a predetermined criteria.

In an embodiment, method step (c) is performed using audio streaming technology. In an embodiment, method step (b) is performed using audio streaming technology.

An embodiment of the present invention provides for a personal receptionist server for connecting in real-time an originating communications device of an originating caller to a destination communications device of a destination caller based on a call request entered via a web page, the personal receptionist server comprising: network interface means for receiving the call request; personal receptionist server means for processing the call request; destination telephone interface means for placing a telephone call to the destination communications device; interactive voice response means for determining whether the destination caller will accept a telephonic call from the originating caller; originating telephone interface means for placing a telephone call to the originating communications device; and call completion means for connecting the telephonic calls to the originating and destination communications devices.

In an embodiment, the personal receptionist server means includes a computer system and personal receptionist software. In an embodiment, the network interface means includes a local area network interface device and communications protocol software. In an embodiment, the destination and originating telephone interface means and the call completion means includes a public switched telephone network interface device and associated control software. In an embodiment, the originating telephone interface means includes audio steaming technology. In an embodiment, the personal receptionist software includes remote applet services software. In an embodiment, the remote applet services software includes Java RMI technology.

Embodiments of the present invention include computer-readable medium containing computer-executable instructions for performing a method of the present invention, and a computer system having a processor and memory and performing a method of the present invention. An embodiment of the method of the present invention provides for connecting in real-time an originating communications device of an originating caller to a destination communications device of a destination caller, wherein the method comprises the steps of (a) receiving a call request entered via a web page, the call request including a destination identification of the destination caller or destination communications device; (b) initiating a page to the destination caller based on the received destination identification; (c) receiving a call from the destination communications device; (d) calling the originating communications device; and (e) bridging the calls from the destination communications device and the call to the originating communications device.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

DETAILED DESCRIPTION OF THE PREFERRED EMBODIMENT

Figure 1:
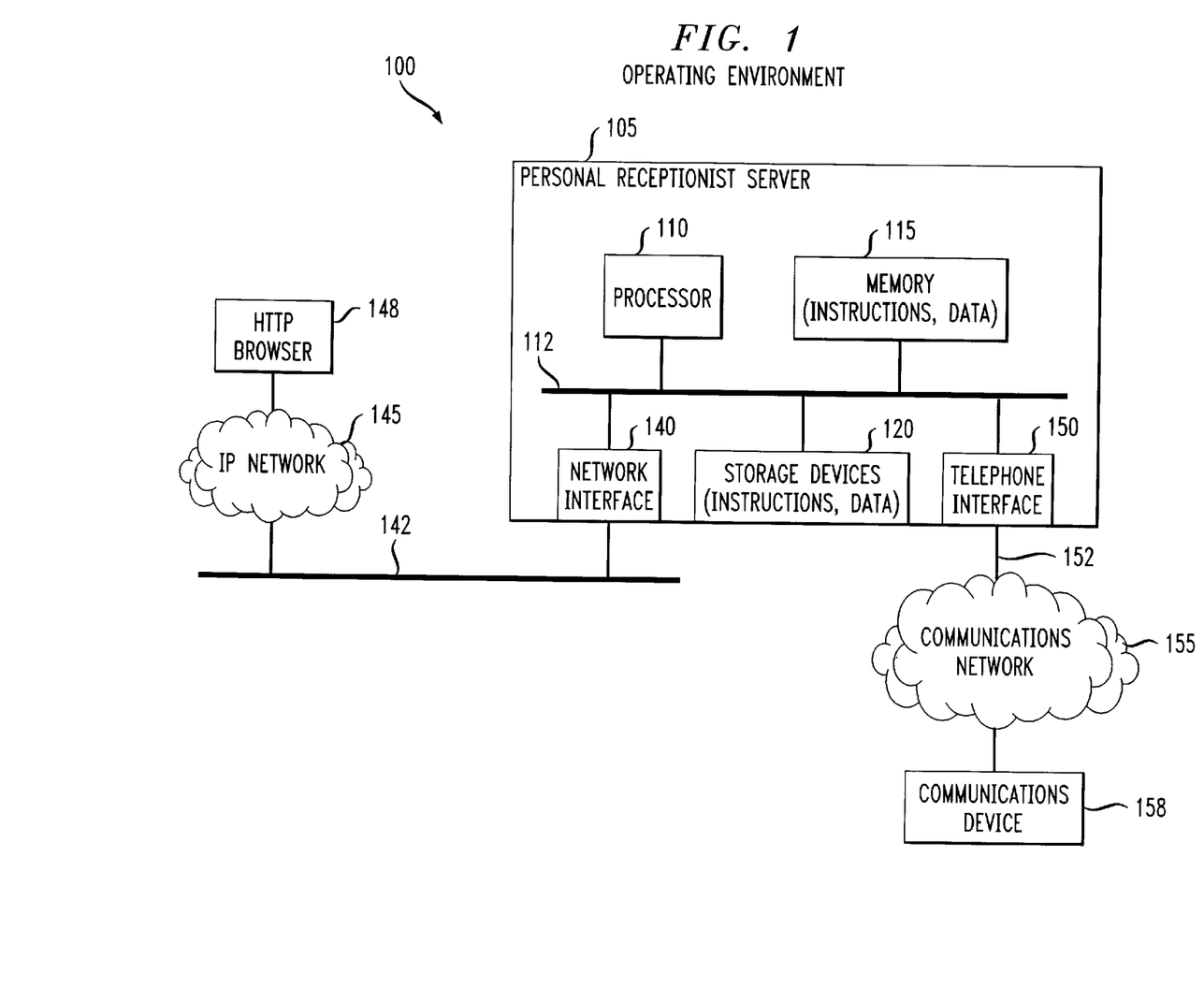
FIG. 1 is a block diagram of an exemplary operating environment in which the invention may be implemented.

FIG. 1 and its discussion herein are intended to describe a description of a general computing environment in which the present invention can be practiced. The present invention is not limited to a single computing environment. Moreover, the architecture and functionality of the present invention as taught herein and would be understood by one skilled in the art is extensible to an unlimited number of computing environments and embodiments in keeping with the scope and spirit of the present invention.

Turning now to FIG. 1, illustrated is an exemplary operating environment 100 for practicing the present invention.

Personal receptionist server 105 embodies the functionality of the present invention by receiving requests from browser 148 using the HTTP Internet communications protocol to contact a communications device 158. HTTP browser 148, in a typical configuration as illustrated in FIG. 1, connects to the Internet 145 which communicates with network interface 140 of personal receptionist server 105 via Local/Wide Area Network (LAN/WAN) 142. Similarly, communications device 158 communicates with telephone interface 150 of personal receptionist server 105 via a communications network 155 (e.g., the public switched telephone network) over communications facility 152. Communications device 158 could be one or more of a whole host of communication devices, including a cellular telephone, a pager, voice mail, a facsimile device, and email. Depending on the type of communications device 158, communications network 155 can vary. As would be understood by one skilled in the art, illustrated in FIG. 1 is just one of unlimited number of configurations for practicing the present invention while keeping within the scope and spirit of the present invention.

Personal receptionist server 105 typically comprises a standard computer platform with appropriate network interface 140 and telephone interface 150. Personal receptionist server 105 includes a processor 110, memory 115, storage devices 120, network interface 140, and telephone interface 150 which are electrically coupled via bus 112. Memory 115 is one type of computer-readable medium, and typically comprises random access memory (RAM), read only memory (ROM), integrated circuits, and/or other memory components. Memory 115 typically stores computer-executable instructions to be executed by processor 110 and/or data which is manipulated by processor 110. Storage devices 120 are another type of computer-readable medium, and typically comprise disk drives, diskettes, networked services, tape drives, and other storage devices. Storage devices 120 typically store computer-executable instructions to be executed by processor 110 and/or data which is manipulated by processor 110. In one configuration, personal receptionist server 105 comprises a standard computer platform running Windows NT 4.0 operating system and having an Ethernet network interface 140, and a standard analog telephone interface 150 such as voice port cards made by Dialogic.

Figure 2:
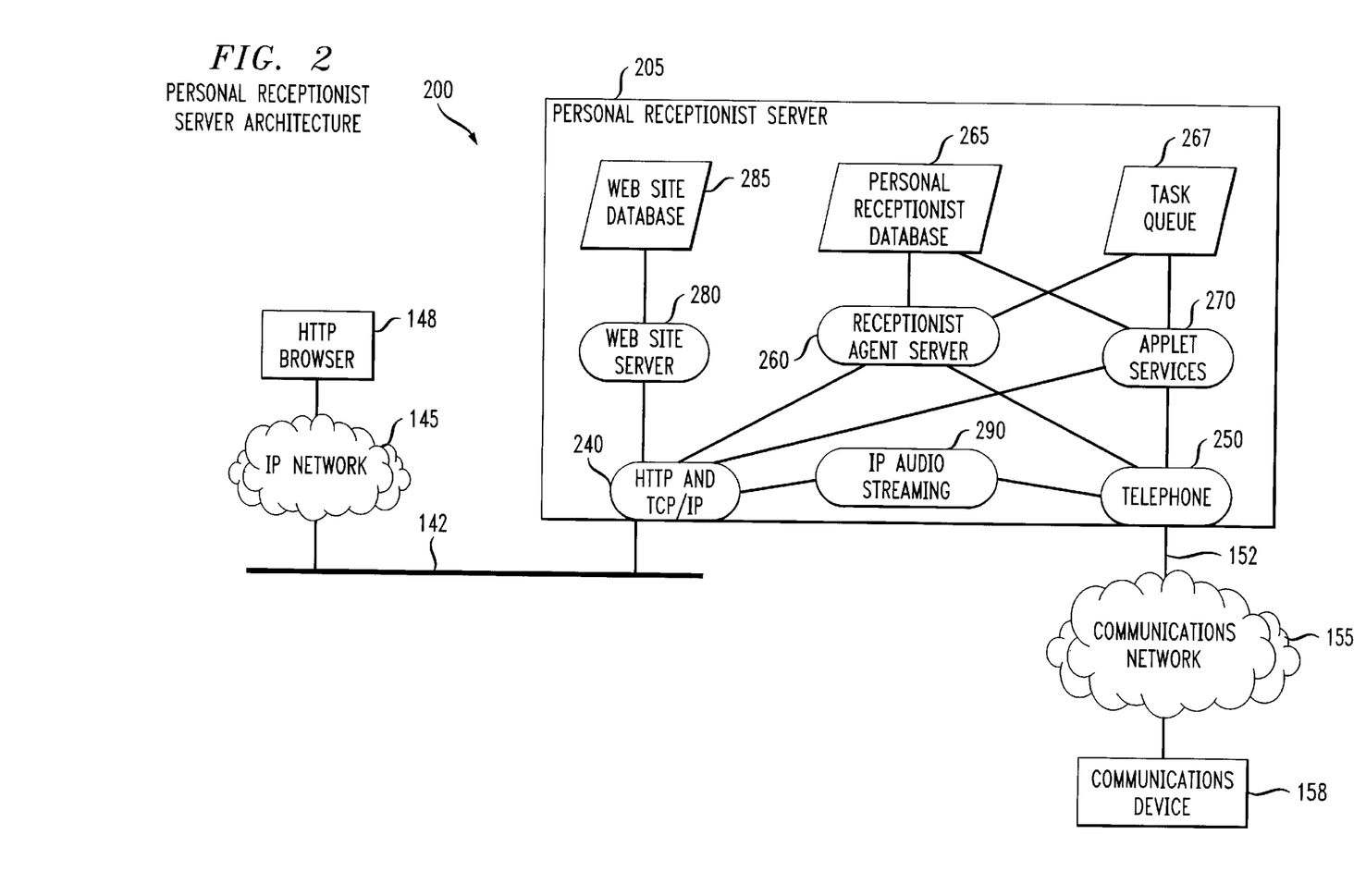
FIG. 2 is a block diagram of the processing architecture of an embodiment of the present invention.

Turning now to FIG. 2, illustrated is an exemplary operating environment 200 for practicing the present invention which illustrates the personal receptionist server 205. Personal receptionist server 205, in one embodiment, comprises a HTTP and TCP/IP interface 240 for communicating with HTTP browser 148. Upon request for a personal receptionist server web page by HTTP browser 148, web site server 280 reads a web page from its web site database 285 and sends the web page including an applet to the HTTP browser 148. Web site server 280, in one configuration, comprises a Microsoft Internet Information Server. Included in the web page sent to the HTTP browser 148 is at least one applet. Once running, the applet communicates with the applet services 270 to receive personal receptionist server requests and to provide status updates to the HTTP browser 148. In one embodiment, applet services 270 comprises Sun Microsystems Javasoft Java Development Kit 1.1.7 Remote Method Invocation ("RMI") package software. Upon receipt of a communication request, applet services 270 deposits software. Upon receipt of a communication request, applet services 270 deposits the desired operation in task queue 267. In one embodiment, the database services of personal receptionist server 205 are performed using Microsoft Access database software.

The personal receptionist agent server 260 checks the task queue for awaiting desired operations. Personal receptionist agent server 260 dequeues one of these operations and then performs the desired task using data stored in personal receptionist database 265 which contains contact information and client (destination caller) preferences. Personal receptionist agent server 260 also communicates with telephone process 250 to contact communication device 158. Additionally, in one configuration HTTP browser 148 having IP audio streaming capabilities can communicate with communications device 158 (e.g., a cellular telephone) through personal receptionist server 205 using a IP audio streaming process 290 as illustrated in FIG. 2.

Figure 3:
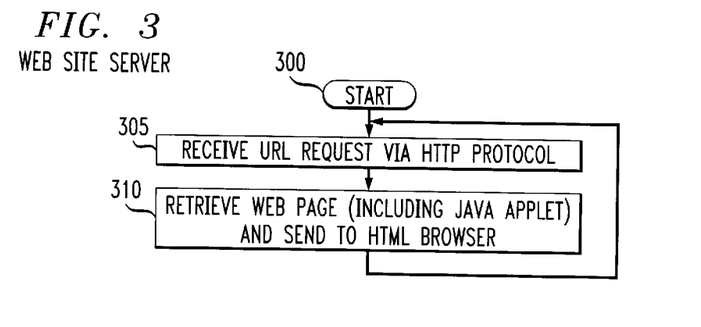
FIG. 3 is a flow diagram of the processing by the web site server.

Turning now to FIG. 3, illustrated are the steps performed by the web site server 280 in one embodiment of the present invention. Processing begins with step 300, and then proceeds to step 305 wherein web site server 280 receives a URL (Universal Resource Locator) via HTTP protocol for a web page of the personal receptionist server 205. Web site server 280, in step 310, then retrieves the web page from web site database 285 and sends the HTML web page including the personal receptionist Java applet to the HTTP browser 148.

The Java applet then begins to run and attempts to contact applet services 270 via the standard Java RMI client/server registration methodology. The processing of the Java applet of the originating caller running in HTTP browser 148 is illustrated in FIG. 4, and the steps performed by applet services 270 are illustrated in FIG. 5.

Figure 4:
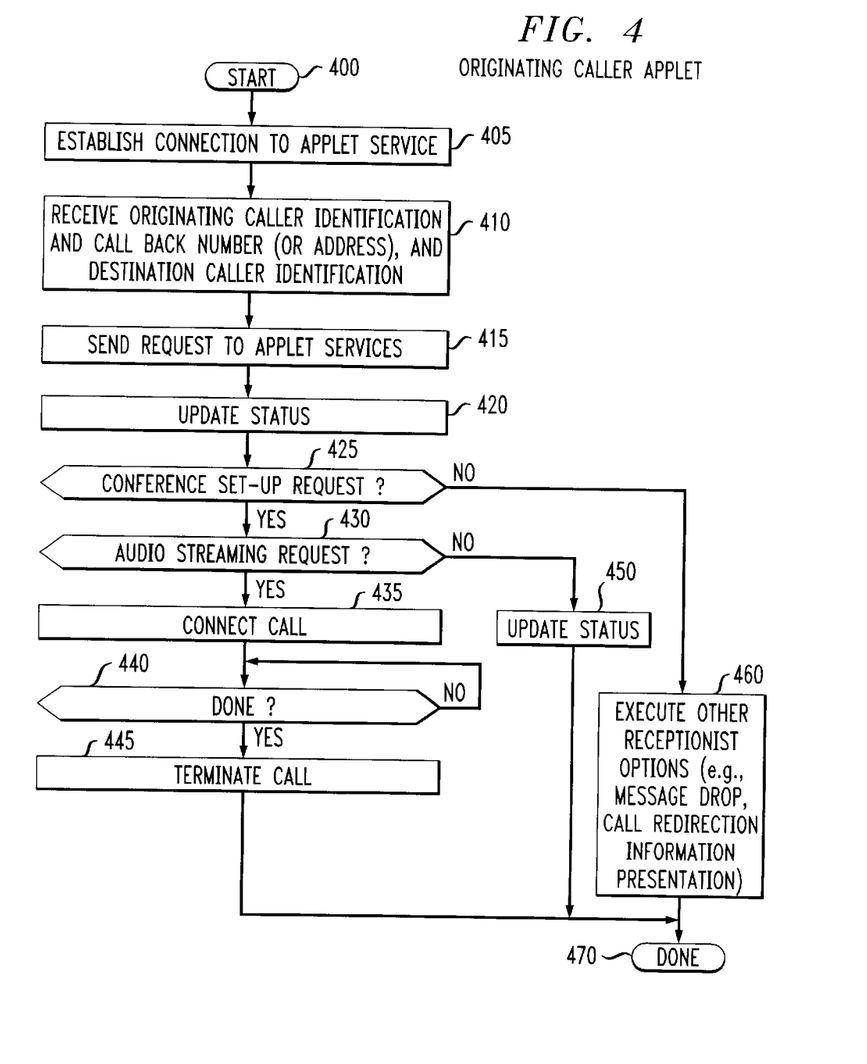
FIG. 4 is a flow diagram of the processing by an applet associated with the originating caller.
Figure 5:
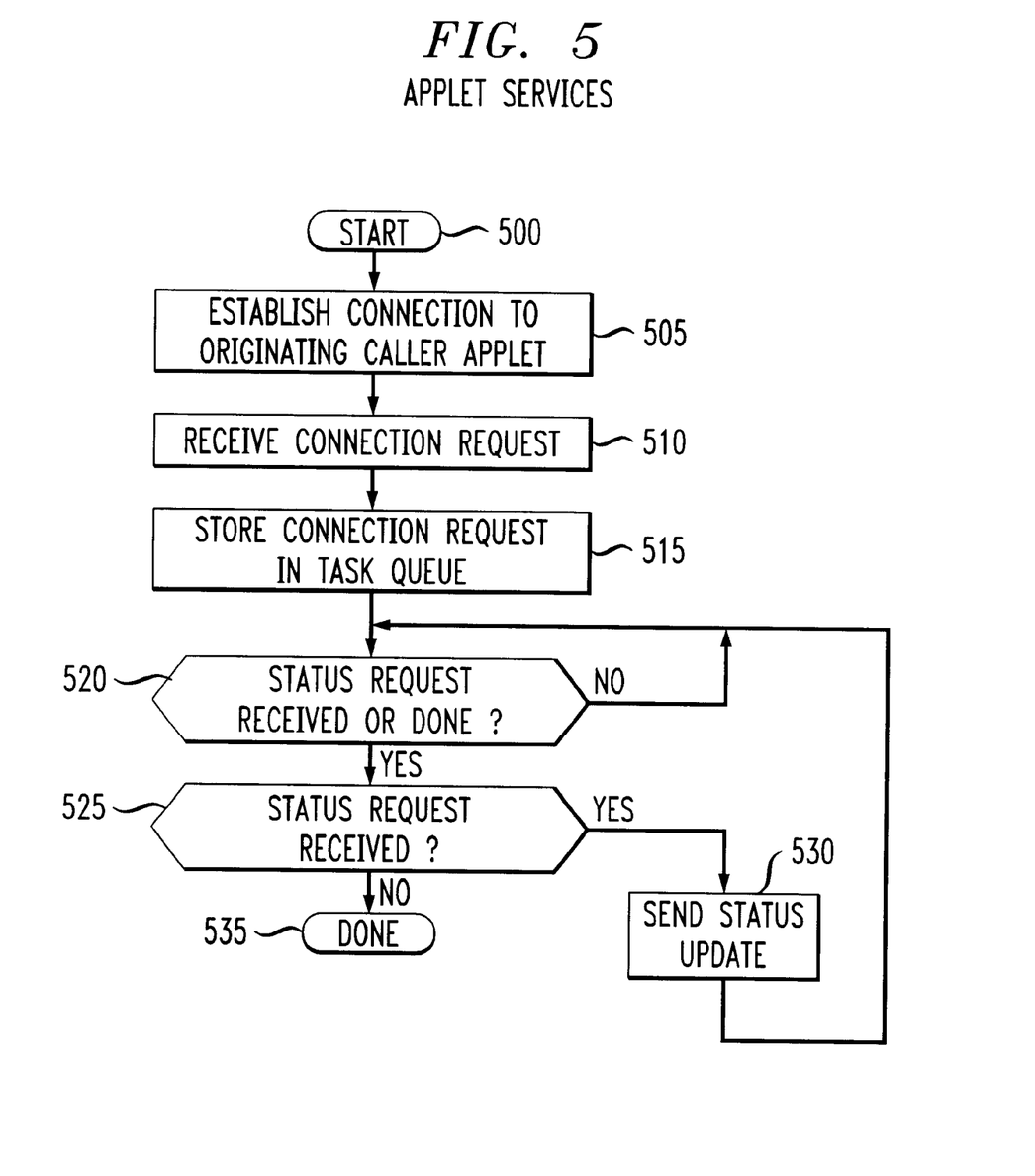
FIG. 5 is a flow diagram of the processing by the applet services.

Turning now to FIG. 4, processing begins by the originating caller applet running on HTTP browser 148 with step 400. Next, in step 405, Java applet establishes a communication connection to applet services 270 using the standard Java RMI client/server registration methodology. Then, in step 410, the Java applet receives the originating call back number and originating caller identification, as well as identification of the personal receptionist server client (destination caller) to whom the originating caller wishes to speak. This request is then sent to applet services 270 in step 415. The applet then requests status updates in step 420 (by sending a status request to and receiving a reply from applet services 270) until a conference set-up request or denial is received, a time-out occurs, or the originating caller cancels the call request. Applet services 270 responds to the status request by retrieving the status of the call request maintained in the task queue 270.

Next, in step 425, if a conference request is requested, then if the call is to be connected using audio steaming technology as determined in step 430, then the call is connected in step 435. When the connected audio steaming call is completed as determined in step 440, the call is terminated in step 445, and processing is completed as indicated by step 470. Otherwise, if determined in step 430, audio steaming technology is not to be used, the call will be completed using other communications technology (e.g., cellular or analog phones). The applet then requests status updates in step 450 (by sending a status request to and receiving a reply from applet services 270) until the conference call is connected, a time-out occurs, or the conference call request is canceled.

If, in step 425, there was no conference call set-up request made (i.e., the destination caller was unreachable or declined the call), then the applet executes receptionist options (step 460), such as message drop, call redirection, and information presentation. These numerous receptionist options are extensible as would be understood by one skilled in the art.

Embodiments provide a message interface for leaving a text or audio message for the destination caller and place it in a message server (e.g., email, voicemail), the ability to transfer the originating caller to other services, and menus and other user interface mechanisms for gathering information from the originating caller.

Turning now to FIG. 5, illustrated is the processing by applet services 270 (FIG. 2) which parallels the processing by the Java applet and HTTP browser 148 and described in FIG. 4. Applet services processing begins with step 500 and proceeds to step 505 where a communication connection is established with the originating caller applet. Next, in step 510, the applet services receives a connection request to a client (destination caller) of the personal receptionist server 205, which is stored in task queue 267 in step 515. Next, in step 520 applet services checks to see whether it has received a status request or whether processing is completed. If not, step 520 loops upon itself. Otherwise, step 525 is performed to see if a status request has been received. If so, a status update message is sent to the remote Java applet in step 530; otherwise, processing is completed as indicated in step 535.

Figure 6:
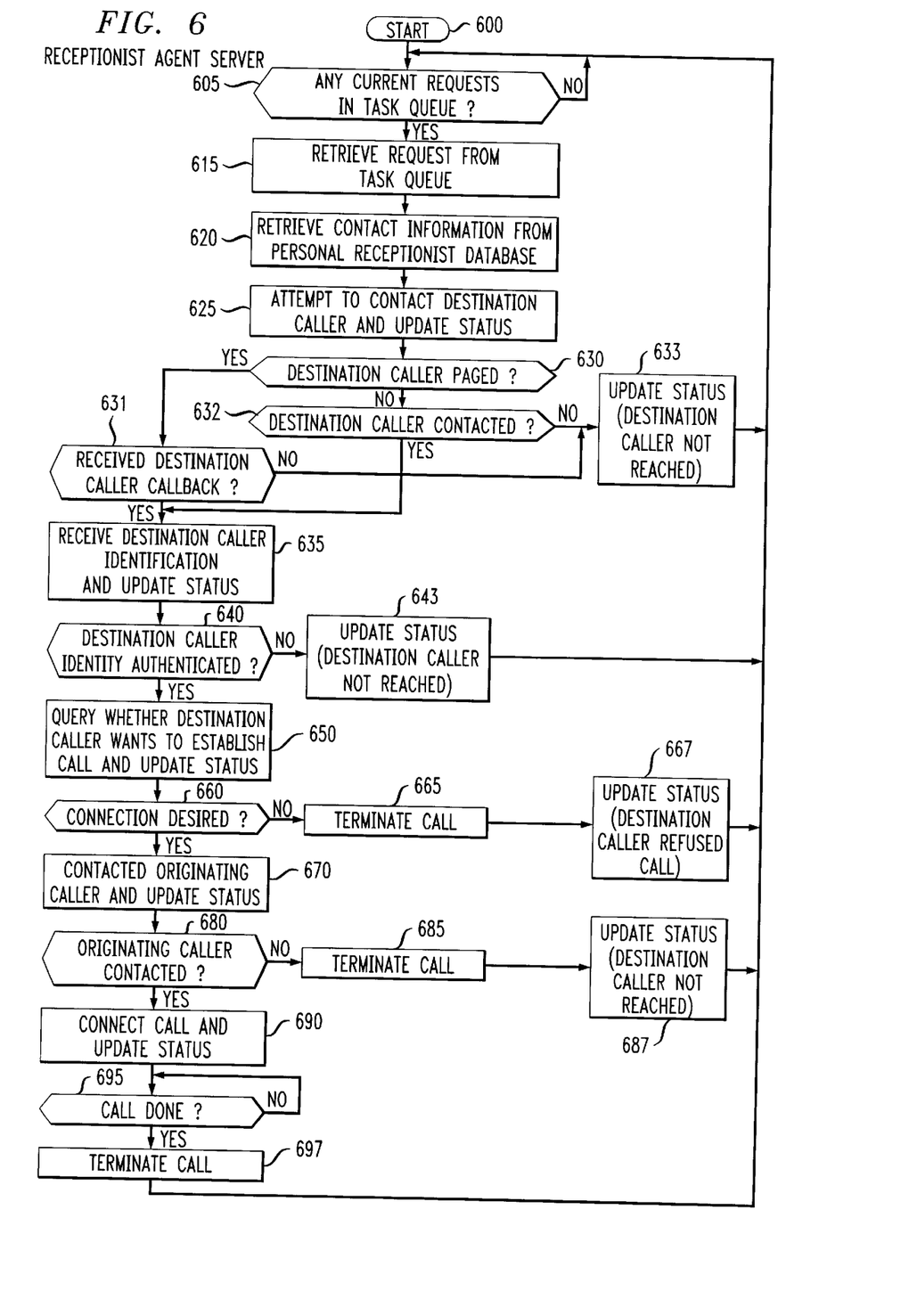
FIG. 6 is a flow diagram of the processing by the receptionist agent.

Turning now to FIG. 6, illustrated are the steps performed by an embodiment of the personal receptionist agent server 260 (FIG. 2) in accordance with the present invention. Processing begins at step 600 and then proceeds to step 605 wherein the personal receptionist agent server 260 checks the task queue 267 to see if there are any pending requests. If not, step 605 loops upon itself until such a request is received. When task queue 267 contains such a request, the request is retrieved from task queue 267 in step 615. Then, in step 620, contact information for the destination caller is retrieved from the personal receptionist database 265. Using this information, the destination caller is attempted to be contacted in step 625 and the status of the pending request is updated in the task queue. The destination caller can be contacted in numerous ways as would be understood by one skilled in the art. For example, a set of contact telephone, audio streaming connection (e.g., IP address and port number), and pager numbers could be stored in the personal receptionist database 265 (FIG. 2), possibly tagged with time/day/date specific information for if and how to contact the personal receptionist client (destination caller). Depending on the client preferences, a telephone or audio streaming call could be placed to the destination caller, or the destination caller could call the personal receptionist server 105, 205 in response to a page. This call could be either via the public switched/cellular telephone networks, or even an audio streaming call on the Internet.

As indicated by step 630, if the destination caller was paged, then step 631 is performed to determine whether the destination caller called the personal receptionist server 105, 205 or whether a time-out occurred. Otherwise, the destination caller was attempted to be reached by the personal receptionist server 105, 205 calling the destination caller as indicated by step 632. If the destination caller is not reached, then step 633 is performed to update the status of the pending request in the task queue 267 as the destination caller has not been reached, and then processing returns to step 605 to check for any other pending destination caller connection request.

Otherwise, if the destination caller is contacted either by a completed outgoing call to the destination caller or by the destination caller calling the receptionist agent service (e.g., in response to a page from the receptionist server), step 635 is optionally performed to receive destination caller identification information and to update the status of the current request. One feature of the present invention provides for some kind of security password of the destination caller which he would then enter to confirm that the destination caller is actually has been reached. If the destination caller identity has not been authenticated as determined in step 640, then the status of the requested updated as the destination caller has not been reached as indicated by step 643, and processing returns processing to step 605.

Otherwise, the identification of the destination caller has been authenticated (or not checked—possibly determined by a client preference option), and step 650 is performed to query the destination caller whether to establish the call with the originating caller with the status of the pending request updated in task queue 267. If a connection is desired by a destination caller as determined in step 660, then the originating caller is contacted in step 670. The personal receptionist agent server 260 calls the originating caller using telephone interface 150/process 250. If the originating caller is reached as determined in step 680, the pending calls to the destination caller and originating caller are bridged by telephone interface 150/process 250 as indicated by 690, with status of the call being updated. When the call is done as determined in 695, the call is terminated in step 697, and processing returns to step 605 to process pending task requests.

Otherwise, if the destination caller does not wish to currently speak with the originating caller as determined in step 660, then the call is terminated as indicated by step 665, and the status of pending request is updated in step 667.

In the case where the originating caller cannot be reached as determined in step 680, then the current call to the destination caller is terminated in step 685 and the status of the pending request is updated as indicated by step 687. Otherwise, when the originating caller is reached as determined in step 680, the originating and destination user calls are bridged/conferenced and the status of the call updated in step 690. When the conference call is completed as determined at step 695, then the calls are terminated at step 697.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. An automated method, operable in a personal receptionist, to connect in real-time an originating communications device of an originating caller to a destination communications device of a destination caller comprising:

receiving a call request entered via a web page from the originating caller;

processing the call request;

retrieving, from a personal receptionist database connected with said personal receptionist server, and based on a destination identification of the destination caller received in said call request, a destination telephone number of the destination communications device;

placing a first telephone call to the destination communications device using the destination telephone number;

determining whether the destination caller will accept the first telephone call from the originating caller;

placing a second telephone call to the originating communications device if the destination caller will accept the first telephone call from the originating caller; and connecting the first telephone call and the second telephone call to the destination and originating communications devices.

2. The method of claim 1 further comprising:

receiving and authenticating an identification code of the destination caller before performing the step of connecting the first and second calls.

3. The method of claim 1, wherein the step of placing a first telephone call comprises:

receiving a call completion request from the destination caller.

4. The method of claim 1, further comprising:

receiving an originating identification of the originating caller or the originating communications device; and wherein said step of determining is performed based on the received originating identification.

5. The method of claim 1, wherein the received destination identification of the destination caller identifies a group of callers, and said step of retrieving a destination telephone number comprises:

selecting one of the identified group of callers based on a predetermined criteria.

6. The method of claim 1, wherein said step of placing a second telephone call is performed using audio streaming technology.

7. The method of claim 1, wherein said step of placing a first telephone call is performed using audio streaming technology.

8. A computer-readable medium having computer-executable instructions for performing an automated method, operable in a personal receptionist, for connecting in real-time an originating communications device of an originating caller to a destination communications device of a destination caller, the method comprising:

receiving a call request entered via a web page from the originating caller, the call request including a destination identification of the destination caller;

retrieving, from a personal receptionist server database and based on the received destination identification of the destination caller, a destination telephone number of the destination communications device;

processing the call request;

calling the destination communications device based on the destination telephone number retrieved using the received destination identification;

determining whether the destination caller will accept the telephone call from the originating caller;

calling the originating communications device if the destination caller will accept the call from the originating caller; and bridging the calls to the destination communications device and originating communications device.

9. The computer-readable medium of claim 8, further comprising computer-executable instructions for performing the step of:

receiving and authenticating an identification code of the destination caller before performing the step of bridging the calls.

10. The computer-readable medium of claim 8, wherein said step of calling the destination communications device comprises:

receiving a call completion request.

11. The computer-readable medium of claim 8, having further computer-executable instructions for performing the step of:

receiving an originating identification of the originating caller or the originating communications device; and wherein said step of calling the originating communications device is performed based on the received originating identification.

12. The computer-readable medium of claim 8, wherein the received destination identification of the destination caller identifies a group of callers, and said step of retrieving a destination telephone number comprises:

selecting one of the identified group of callers based on a predetermined criteria.

13. The computer-readable medium of claim 8 wherein said step of calling the destination communications device is performed using audio streaming technology.

14. The computer-readable medium of claim 8 wherein said step of calling the originating communications device is performed using audio streaming technology.

15. A personal receptionist server for connecting in real-time an originating communications device of an originating caller to a destination communications device of a destination caller based on a call request entered via a web page from the originating caller, the personal receptionist server comprising:

network interface means, including a local area network interface device and communications protocol software, for receiving the call request from the originating caller, the call request including a destination identification of the destination caller;

a computer system, including personal receptionist software, for retrieving, from a personal receptionist server database and based on the received destination identification of the destination caller, a destination telephone number of the destination communications device;

destination telephone interface means for placing a telephone call to the destination communications device based on the destination telephone number retrieved using the received destination identification in response to the call request;

interactive voice response means for determining whether the destination caller will accept a telephonic call from the originating caller;

originating telephone interface means for placing a telephone call to the originating communications device if the destination caller will accept the telephonic call from the originating caller; and call completion means for connecting the telephonic calls to the originating and destination communication devices.

16. The personal receptionist server of claim 15, wherein the destination telephone interface means, the originating telephone interface means and the call completion means includes a public switched telephone network interface device and associated control software.

17. The personal receptionist server of claim 15, wherein the originating telephone interface means includes audio steaming technology.

18. The personal receptionist server of claim 15, wherein the personal receptionist software includes remote applet services software.

19. The personal receptionist server of claim 18, wherein the remote applet services software includes Java RMI technology.

* * * * *